No. 780,260. PATENTED JAN. 17, 1905.
M. W. BEEMER.
DASHER.
APPLICATION FILED FEB. 16, 1904.

2 SHEETS—SHEET 1.

Witnesses:
F. George Barry
Henry Thiene

Inventor:
Mike W. Beemer
by attorneys

No. 780,260. PATENTED JAN. 17, 1905.
M. W. BEEMER.
DASHER.
APPLICATION FILED FEB. 16, 1904.
2 SHEETS—SHEET 2.
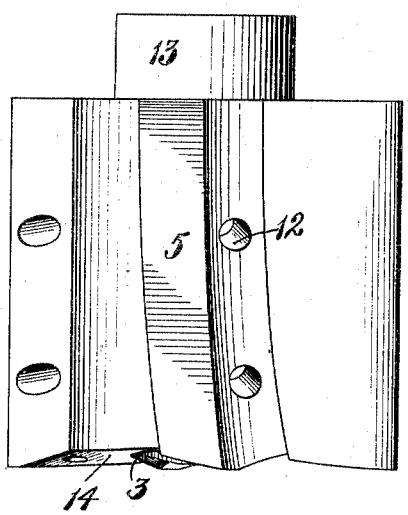
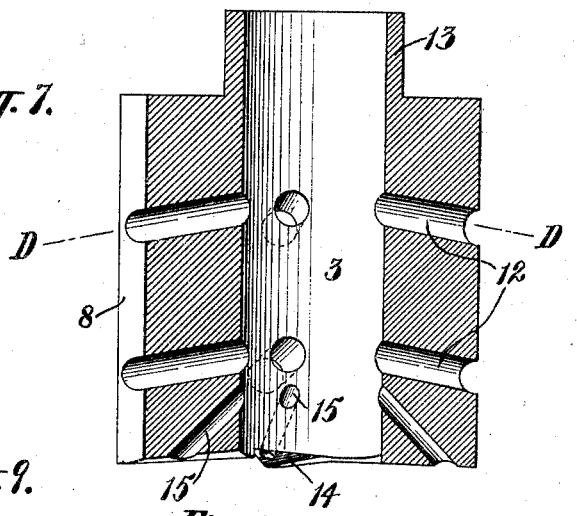
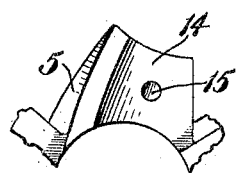
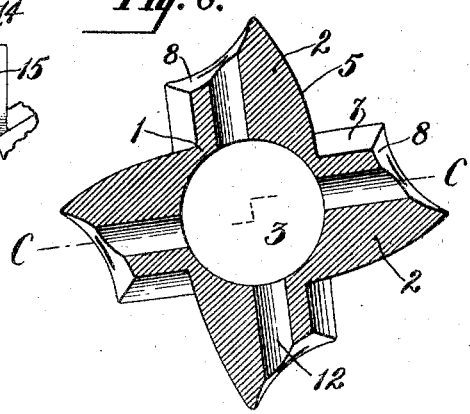
Witnesses:
F. G. Hachenberg.
Henry Thieme.
Inventor:
Miles W. Beemer
by attorneys No. 780,260. Patented January 17, 1905.

UNITED STATES PATENT OFFICE.

MILES W. BEEMER, OF NEW YORK, N. Y.

DASHER.

SPECIFICATION forming part of Letters Patent No. 780,260, dated January 17, 1905.

Application filed February 16, 1904. Serial No. 193,852.

*To all whom it may concern:*

Be it known that I, MILES W. BEEMER, a citizen of the United States, and a resident of the borough of Manhattan, in the city and State of New York, have invented a new and useful Improvement in Dashers, of which the following is a specification.

My invention relates to an improvement in dashers, and has for its principal object to produce a dasher by the use of which a very complete and consequent thorough mixing of the liquid being treated is accomplished.

A further object is to provide a dasher which may be easily rotated at a high speed in the liquid and in which the dasher is so shaped and the air-ducts are so arranged that a large amount of air is primarily directed into the liquid at a considerable distance below its surface for accomplishing the results above set forth.

A practical embodiment of my invention is represented in the accompanying drawings, in which—

Figure 1:
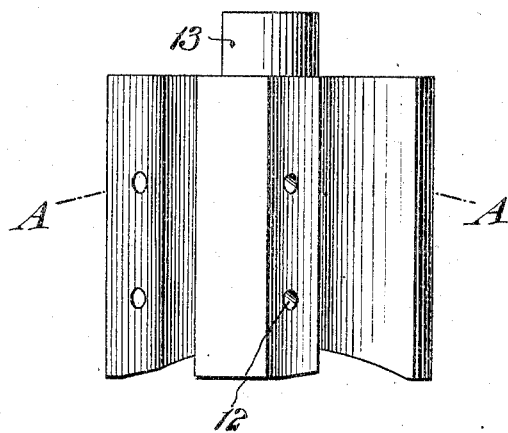
Figure 3:
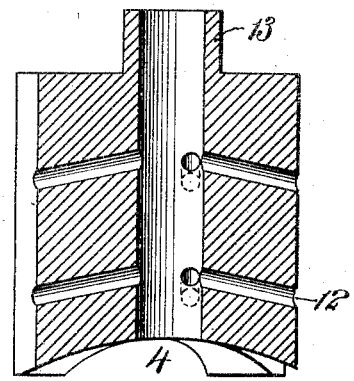
Figure 2:
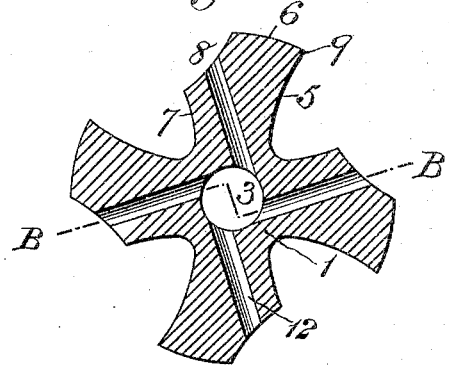
Figure 4:
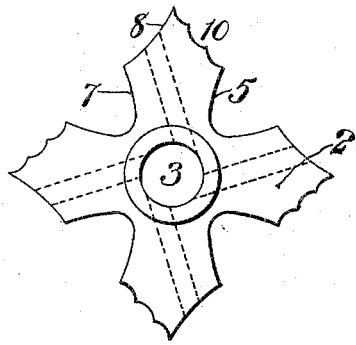
Figure 5:
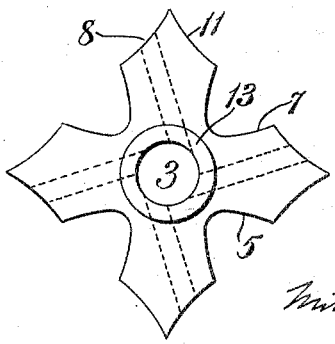

Figure 1 represents the dasher in side elevation. Fig. 2 is a transverse section taken in the plane of the line A A of Fig. 1 looking downward. Fig. 3 is a vertical section taken in the plane of the line B B of Fig. 2. Fig. 4 is a top plan view of a modified form of dasher. Fig. 5 is a top plan view of a third form of dasher. Fig. 6 is a side view of a fourth form of dasher embodying my invention. Fig. 7 is a vertical section through the same in the plane of the line C C of Fig. 8. Fig. 8 is a transverse section in the plane of the line D D of Fig. 7, and Fig. 9 is a detail bottom plan of one of the wings.

The dasher comprises a central portion 1, from which a plurality of wings 2 radiate. A central vertical air-duct 3 extends from top to bottom through the dasher and is preferably of quite large area in cross-section for permitting a very free passage of air therethrough. The bottom of the dasher is made concave, as shown at 4, for the purpose of inducing a quantity of the air which descends through the vertical central air duct or passage 3 to pass out of the lower end of the duct, owing to a partial vacuum being formed in such concave portion of the dasher by the rapid rotation of the dasher.

The front faces of the wings 2 are denoted by 5, their outer faces by 6, and their rear faces by 7. The outer rear portions of the wings are cut away, as shown at 8, and in the form shown in Figs. 1, 2, and 3 sharp cutting edges 9 are formed by the junction of the front faces 5 of the wings with the outer faces 6. In Fig. 4 the outer front portions of the wings are cut away, such cut-away portions being provided with vertical corrugations 10, while in Fig. 5 the cut-away front portions 11 are plain. In Figs. 6 to 9, inclusive, the front faces of the wings are convex in cross-section and the wings themselves are slightly spiral, as shown.

Transverse air ducts or passages 12 lead outwardly from the vertical central air passage or duct 3 and open through the rear cut-away portions 8 of the wings at a distance from the outer front portions of said wings. These transverse air ducts or passages 12 preferably lead tangentially away from the said vertical air passage or duct 3 and preferably lead downwardly and outwardly, so that the air which is drawn outwardly therethrough is directed downwardly into the liquid away from its surface.

In the present instance I have shown each of the wings as being provided with two of these transverse ducts or passages 12; but it is to be understood that each wing may be provided with one or more of these passages or ducts, as may be found most suitable for the particular work to be accomplished. I have also shown the dasher as being provided with an uprising central hub 13 for the attachment of a shaft-fitting. (Not shown herein.)

The formation of the outer rear cut-away portions 8 in the dasher-wings causes a partial vacuum to be formed at those points when the dasher is rotated rapidly, thus drawing the air out through the transverse ducts 12 into the liquid. By making these ducts tangential I am enabled to get a greater suction of air downwardly therethrough as the dasher is rotated.

The front faces 5 of the dasher-wings may be made in various forms in cross-section, that which I prefer being a slightly-convex form in cross-section, as shown in Figs. 6 to 9, inclusive, so that the cream or other liquid being treated is forced outwardly away from the body of the dasher as the dasher is rotated. In this form the rear portion of the bottom of each wing is cut away, as shown at 14, to still further induce a downdraft of air through the central vertical air-duct 3. Also diagonal air ducts or passages 15 may lead from the central vertical air duct or passage downwardly and outwardly through the cut-away bottoms of the wings 2.

If desired, the dasher-wings may be provided with front cut-away portions as well as rear cut-away portions, as shown in Figs. 4 and 5, and these front cut-away portions may be provided with vertical corrugations for still further agitating the liquid, as shown in Fig. 4.

It is to be understood that the relative sizes of the vertical and transverse ducts may be varied to suit different requirements and that the number of wings may be varied, as well as their shapes, so long as the outer rear cut-away portions are formed to which the transverse passages lead.

What I claim as my invention is—

1. A dasher having a vertical air duct or passage therethrough, a plurality of wings having the outer portions of their rear faces cut away forming an edge along the inner side of each cut-away portion, and transverse air ducts or passages leading from the said vertical air duct or passage outwardly through the wings to the said cut-away portions.

2. A dasher having a vertical air duct or passage therethrough, a plurality of wings having outer rear cut-away portions and transverse air ducts or passages leading from the vertical air duct or passage outwardly and downwardly to the said cut-away portions.

3. A dasher having a vertical central air duct or passage therethrough, a plurality of wings having the outer portions of their front and rear faces cut away forming an edge along the inner side of each cut-away portion, and transverse air ducts or passages leading from the vertical central air duct or passage outwardly through the said wings to the cut-away portions in the rear faces only of the wings at points beyond the body of the dasher.

4. A dasher having a vertical central air duct or passage therethrough, a plurality of wings having the rear portions of their bottoms cut away, the rear portions of their outer ends cut away, transverse air ducts or passages leading from the vertical central air duct or passage outwardly to the cut-away portions of the ends of the wings and diagonal air ducts or passages leading from the vertical central air duct or passage to the cut-away portions of the bottoms of the wings.

In testimony that I claim the foregoing as my invention I have signed my name, in presence of two witnesses, this 9th day of February, 1904.

MILES W. BEEMER.

Witnesses:
 FREDK. HAYNES,
 HENRY THIEME.